C. FULLER.
COFFEE PERCOLATOR.
APPLICATION FILED OCT. 2, 1909.
956,332.
Patented Apr. 26, 1910.
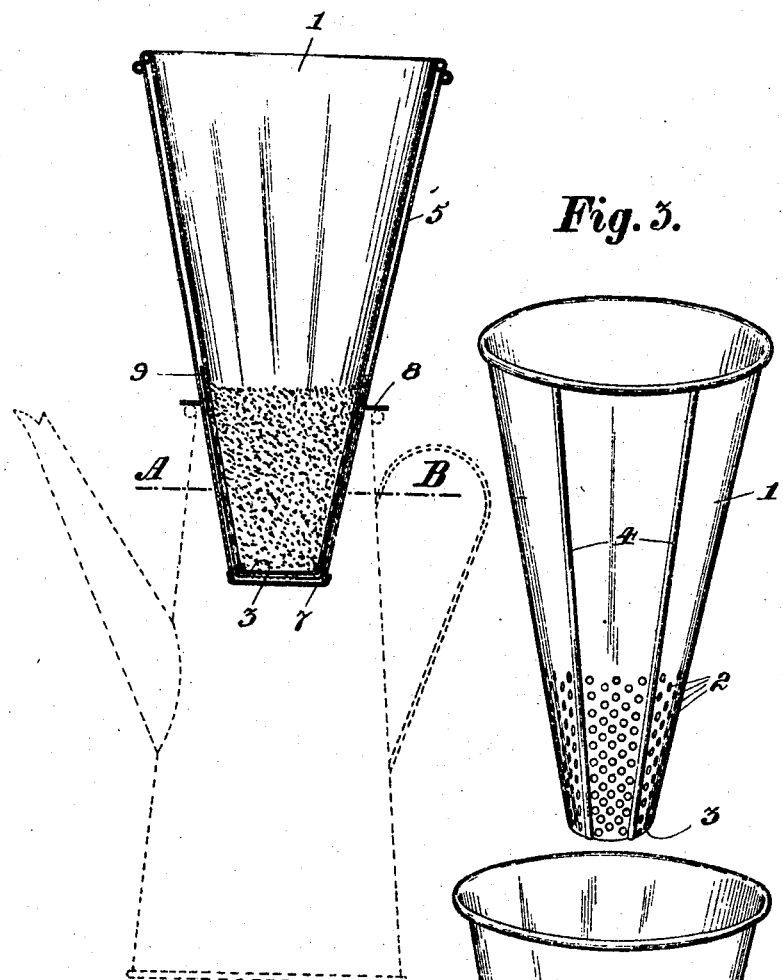

UNITED STATES PATENT OFFICE.

CHARLES FULLER, OF MONTREAL, QUEBEC, CANADA, ASSIGNOR OF ONE-THIRD TO NORMAN SPENCER CROKER AND ONE-THIRD TO ALBERT VICTOR BOUCHER, BOTH OF MONTREAL, CANADA.

COFFEE-PERCOLATOR.

956,332.  Specification of Letters Patent.  Patented Apr. 26, 1910.

Application filed October 2, 1909. Serial No. 520,654.

*To all whom it may concern:*

Be it known that I, CHARLES FULLER, resident of 46 Royal street, in the city and district of Montreal, in the Province of Quebec, in the Dominion of Canada, a subject of the King of Great Britain, have invented certain new and useful Improvements in Coffee-Percolators; and I do hereby declare that the following is a full, clear, and exact description of the same.

The invention relates to improvements in coffee percolators, as described in the present specification and illustrated in the accompanying drawings that form part of the same.

The invention consists essentially in the novel construction and arrangement of parts whereby the extract from coffee is obtained by the percolation of boiling water through the perforated lower ends of inner and outer vessels and through a fibrous material interposed and securely held between the perforated walls of said vessels respectively.

The objects of the invention are to provide a simple and expeditious means of making coffee, as the process is usually termed, to eliminate the complication of parts customary in such machines and generally to devise a percolator of durable and cheap construction, quite within the reach of every customer in regard to price.

In the drawings, Figure 1 is a vertical sectional view of the percolator. Fig. 2 is a cross sectional view on the line A—B in Fig. 1. Fig. 3 is a perspective detail of the inner vessel. Fig 4 is a perspective detail of the outer vessel.

Like numerals of reference indicate corresponding parts in each figure.

Referring to the drawings, 1 is the inner vessel, cone shaped, and having perforations 2 in the side walls toward the lower end thereof, and the solid bottom 3.

4 are vertical ribs extending from the top of the side wall at intervals therearound to the solid bottom 3 on the outer side of said side wall.

5 is the outer vessel having the perforations 6 smaller in dimension than the perforations 2, and the solid bottom 7, said outer vessel 5 being also cone-shaped and adapted to contain the inner vessel 1.

8 is a flange extending around the outer side of the outer vessel above the perforations 6 and rigidly secured thereto, said flange being adapted to support the said outer vessel from the top edge of the coffee pot or other receptacle for the extract.

9 is a piece of rice paper inserted in the bottom portion of the outer vessel 5 and completely covering the perforations 6 so that when the inner vessel 1 is inserted, the ribs 4 will tightly hold the said rice paper against the inner side of the perforated wall of the outer vessel.

In the use of this device, a piece of rice paper or any other suitable material preferably of a fibrous nature is inserted in the bottom portion of the outer vessel. The inner vessel is then placed in the outer vessel so that that portion of the vessel containing the perforations 2 is opposite that portion of the outer vessel containing the perforations 6. The coffee is then placed in the bottom of the inner vessel covering all or part of the perforations according to the quantity of the extract desired. The boiling water is then poured into the inner vessel and percolates through the coffee, the perforations 2, the rice paper 9 and the perforations 6, gathering in passage the full flavor of the coffee and dropping into a hot receptacle from which it is quite ready to be used as a beverage.

What I claim as my invention is:

In a coffee percolator, a cone-shaped outer cup or vessel having an annular flange projecting outwardly therefrom intermediate of its height, a solid wall above said flange and a sieve-like wall below said flange terminating in a circular solid disk bottom, a cone-shaped inner cup or vessel correspondingly formed to said outer cup and fitting closely thereinto having perforations completely therearound through its wall below the flange of said outer cup and a plurality of external vertical ribs extending from the rim at the top to a circular solid disk forming the bottom of the cup, and a sheet of fibrous material introduced into the bottom of said outer cup and held closely to the sides by said external ribs.

Signed at the city and district of Montreal, Quebec, Canada, this 24th day of September, 1909.

CHARLES FULLER.

Witnesses:
G. H. TRESIDDER,
P. SHEE.